United States Patent
Wu et al.

(10) Patent No.: US 11,562,224 B2
(45) Date of Patent: Jan. 24, 2023

(54) 1D-CNN-BASED DISTRIBUTED OPTICAL FIBER SENSING SIGNAL FEATURE LEARNING AND CLASSIFICATION METHOD

(71) Applicant: University of Electronic Science and Technology of China, Sichuan (CN)

(72) Inventors: Huijuan Wu, Sichuan (CN); Jiping Chen, Sichuan (CN); Xiangrong Liu, Sichuan (CN); Yao Xiao, Sichuan (CN); Mengjiao Wang, Sichuan (CN); Bo Tang, Sichuan (CN); Mingru Yang, Sichuan (CN); Haoyu Qiu, Sichuan (CN); Yunjiang Rao, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 1205 days.

(21) Appl. No.: 16/057,828

(22) Filed: Aug. 8, 2018

(65) Prior Publication Data

US 2018/0357542 A1 Dec. 13, 2018

(30) Foreign Application Priority Data

Jun. 8, 2018 (CN) .......................... 201810590114.1

(51) Int. Cl.
*G06N 3/08* (2006.01)
*G06F 17/18* (2006.01)
(Continued)

(52) U.S. Cl.
CPC ............... *G06N 3/08* (2013.01); *G06F 17/18* (2013.01); *G06N 3/04* (2013.01); *G06N 3/0454* (2013.01);
(Continued)

(58) Field of Classification Search
CPC .......... G06N 3/08; G06N 3/04; G06N 3/0454; G06N 5/003; G06N 20/10; G06N 20/20;
(Continued)

(56) References Cited

U.S. PATENT DOCUMENTS

2017/0220854 A1 * 8/2017 Yang .................... G06K 9/6267

FOREIGN PATENT DOCUMENTS

CN        108090412 A  *  5/2018  ......... G06K 9/00536

OTHER PUBLICATIONS

Xu, C., Guan, J., Bao, M., Lu, J., & Ye, W. (2018). Pattern recognition based on time-frequency analysis and convolutional neural networks for vibrational events in φ-OTDR. Optical Engineering, 57(1), 016103. (Year: 2018).*

(Continued)

*Primary Examiner* — Ying Yu Chen

(57) ABSTRACT

A 1D-CNN-based ((one-dimensional convolutional neural network)-based) distributed optical fiber sensing signal feature learning and classification method is provided, which solves a problem that an existing distributed optical fiber sensing system has poor adaptive ability to a complex and changing environment and consumes time and effort due to adoption of manually extracted distinguishable event features. The method includes steps of: segmenting time sequences of distributed optical fiber sensing acoustic and vibration signals acquired at all spatial points, and building a typical event signal dataset; constructing a 1D-CNN model, conducting iterative update training of the network through typical event signals in a training dataset to obtain optimal network parameters, and learning and extracting 1D-CNN distinguishable features of different types of events through an optimal network to obtain typical event signal feature sets; and after training different types of classifiers through the typical event signal feature sets, screening out an optimal classifier.

12 Claims, 10 Drawing Sheets

(51) Int. Cl.
  *G06N 3/04* (2006.01)
  *G06N 5/00* (2006.01)
  *G06N 20/10* (2019.01)
  *G06N 20/20* (2019.01)

(52) U.S. Cl.
  CPC .............. *G06N 5/003* (2013.01); *G06N 20/10* (2019.01); *G06N 20/20* (2019.01)

(58) Field of Classification Search
  CPC  G06F 17/18; G06K 9/00523; G06K 9/00536; G06K 9/6227
  See application file for complete search history.

(56) References Cited

OTHER PUBLICATIONS

Kingma, D. P., & Ba, J. (2014). Adam: A method for stochastic optimization. arXiv preprint arXiv: 1412.6980. (Year: 2014).*

Jiang, F., Li, H., Zhang, Z., & Zhang, X. (Jan. 2018). An event recognition method for fiber distributed acoustic sensing systems based on the combination of MFCC and CNN. In 2017 International Conference on Optical Instruments and Technology: Advanced Optical Sensors and Applications, vol. 10618 (Year: 2018).*

Xiao, Z., Wang, Y., Fu, K., & Wu, F. (2017). Identifying different transportation modes from trajectory data using tree-based ensemble classifiers. ISPRS International Journal of Geo-Information, 6(2), 57. (Year: 2017).*

Burkardt, J. (2014). The truncated normal distribution. Department of Scientific Computing Website, Florida State University, 1, 35. (Year: 2014).*

Sun, D., Wang, M., & Li, A. (2018). A multimodal deep neural network for human breast cancer prognosis prediction by integrating multi-dimensional data. IEEE/ACM transactions on computational biology and bioinformatics, 16(3), 841-850. (Year: 2018).*

Aktas, Metin, et al. "Deep learning based multi-threat classification for phase-OTDR fiber optic distributed acoustic sensing applications." Fiber Optic Sensors and Applications XIV. vol. 10208. International Society for Optics and Photonics, 2017. (Year: 2017).*

Nielsen, M. A. (2015). Neural networks and deep learning (vol. 25). San Francisco, CA, USA: Determination press, p. 62 (Year: 2015).*

* cited by examiner

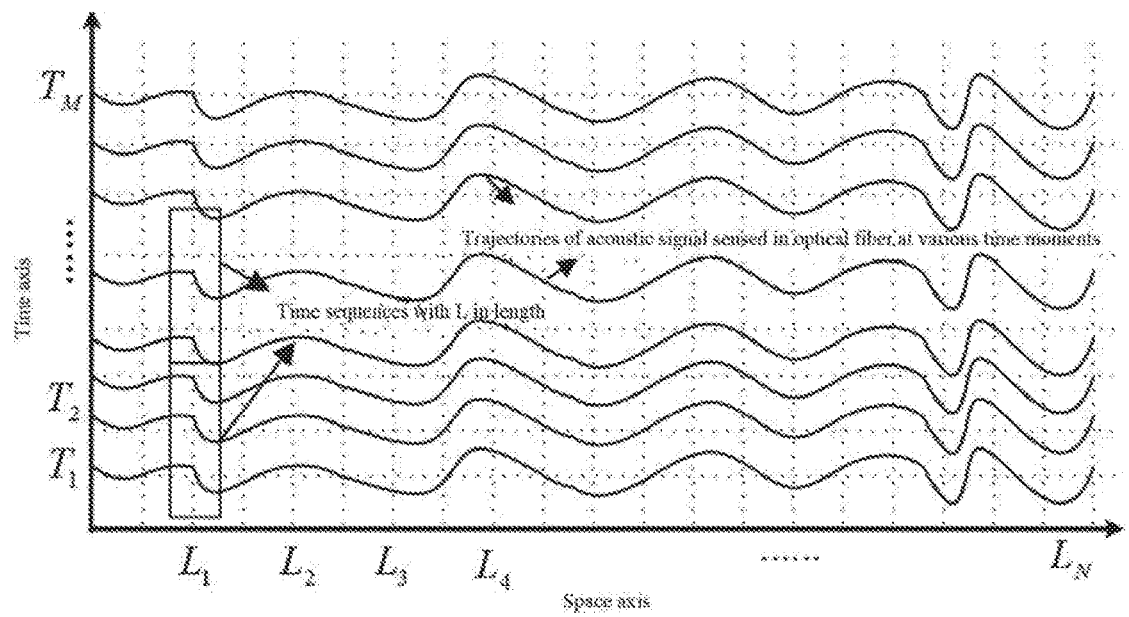
FIG.3
| Event type | Training set/test set (signal sample size) | Defined event label |
|---|---|---|
| Background noise | 1640/653 | 1 |
| Human digging | 6075/2615 | 2 |
| Mechanical excavation | 1027/474 | 3 |
| Vehicle interference | 1907/828 | 4 |
| Factory interference | 664/279 | 5 |
FIG.4
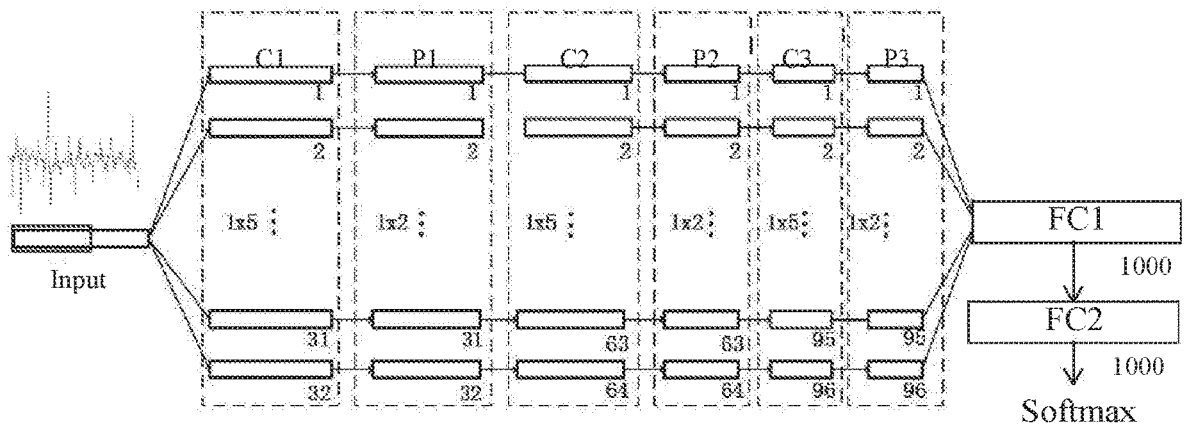
FIG.5

| 1D-CNN layers | Structure parameter(s) |
|---|---|
| Input layer | Size of input matrix: 1×500 |
| C1 | Size of convolution kernel: 1×5; number of convolution kernels: 32; step size: 1 |
| P1 | Size: 1×2; step size: 2 |
| C2 | Size of convolution kernel: 1×5; number of convolution kernels: 64; step size: 1 |
| P2 | Size: 1×2; step size: 2 |
| C3 | Size of convolution kernel: 1×5; number of convolution kernels: 96; step size: 1 |
| P3 | Size: 1×2; step size: 2 |
| FC1 | Number of neurons: 1000 |
| FC2 | Number of neurons: 1000 |
| Softmax | Number of neurons: 5 |
| Filling mode: all-zero filling; pooling mode: max pooling | |

FIG.6

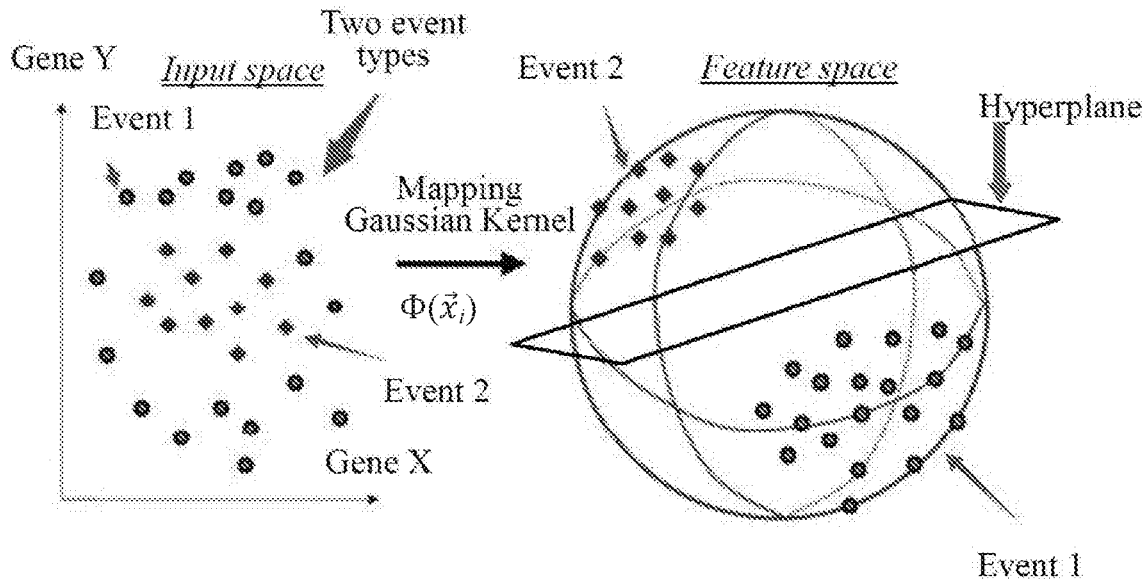

FIG.7

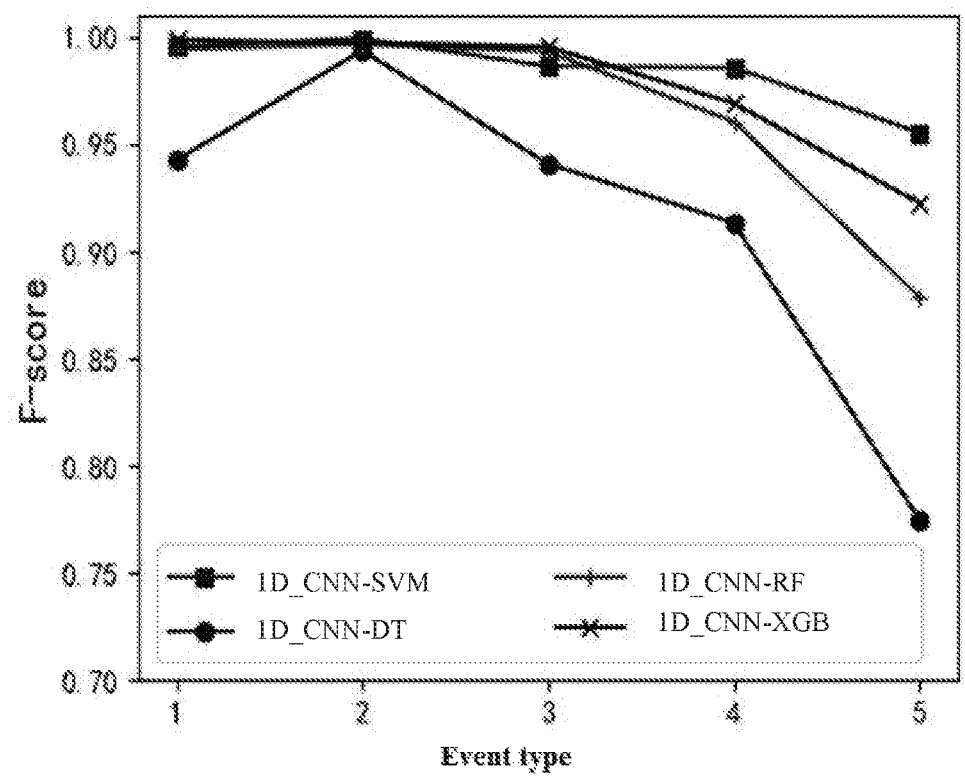

FIG.14

| Feature type | Feature name |
|---|---|
| Time domain | Main impact strength |
| | Short time average magnitude |
| | Short time average energy |
| Transform domain | Wavelet packet energy statistics spectrum |
| | Wavelet packet information entropy |
| Frequency domain | Power spectrum framing entropy |
| | Power spectrum framing variance |
| | Power spectrum magnitude and shape feature |
| Cepstrum domain | MFCC coefficients |

FIG.15

| Event type | Precision | Recall | F-score |
|---|---|---|---|
| Background noise | 0.9942 | 1 | 0.9971 |
| Human digging | 0.9923 | 0.9823 | 0.9873 |
| Mechanical excavation | 0.9801 | 0.9910 | 0.9855 |
| Vehicle interference | 0.9545 | 0.9834 | 0.9687 |
| Factory interference | 0.9842 | 0.9157 | 0.9487 |

FIG.18

1D-CNN-BASED DISTRIBUTED OPTICAL FIBER SENSING SIGNAL FEATURE LEARNING AND CLASSIFICATION METHOD

CROSS REFERENCE OF RELATED APPLICATION

The application claims priority under 35 U.S.C. 119(a-d) to CN 2018105901144, filed Jun. 8, 2018.

BACKGROUND OF THE PRESENT INVENTION

Field of Invention

The 1D-CNN-based ((one-dimensional convolutional neural network)-based) distributed optical fiber sensing signal feature learning and classification method adopts the artificial intelligence method for the extraction and classification of distributed optical fiber acoustic and vibration sensing signals, applicable to application fields such as underground pipe networks, long-distance pipelines, communication optical cables, electric cables, and perimeter and structure security monitoring.

Description of Related Arts

The phase-sensitive optical time domain reflectometry (Φ-OTDR), as a representative of distributed optical fiber sensing technologies, utilizes optical fibers to sense the spatial distribution and time variation information of physical parameters in a surrounding environment including the acoustic wave and vibration. Such technology has the advantages of great long-distance multi-point locating ability, high sensing sensitivity, no functional devices in optical fibers, long service life, single end detection, and simple engineering construction and maintenance. Therefore, as a major technical means for wide-range environmental security monitoring, it plays an important role in application fields such as pipeline safety, optical and electric cable security, railway security, civil structure health monitoring, and perimeter security. In particular, the recent widespread application of the phase demodulation method allows the system to sensitively detect high-frequency acoustic and vibration signals, driving the method to be a research focus for a time in respects of optical fiber sensing research and security monitoring application. However, a certain gap exists at the levels of onsite data analysis and processing, data mining, depth of understanding and application software, preventing the industry from being mature and restricting the progression of its large-scale application. Although the quantitative or qualitative analysis of single point sensing data is not difficult, its large-scale networking brings serious challenges such as the analysis, processing and deep mining of big data generated from monitoring in extensive complex environments, which become a common problem in the current optical fiber sensing field. For existing distributed optical fiber acoustic and vibration sensing systems based on phase demodulation, they face complex extensive monitoring environments in actual application and particularly face varied burial environments at different sections or points. For example, some sections are buried around a rail track, some sections are buried around a road, and some sections are buried around a factory or river, with different types of interference sources depending on the location of the sensed point. The current local observation and processing models and classification methods fail to consider the difference and complexity of network node distribution environments, and the algorithm has poor adaptive ability and generalization ability when facing complex environments; the traditional manual method for feature extraction and pattern identification cannot follow the data updating speed and changing mode of massive data, resulting in poor onsite intelligent detection and identification ability of the system in extensive monitoring, slightly high overall false alarm rate and insufficient intelligence level, and thus is unable to meet actual application requirements.

SUMMARY OF THE PRESENT INVENTION

The present invention aims at solving the problem that the existing distributed optical fiber acoustic and vibration sensing system has poor adaptive ability to complex and changing environment and high false alarm rate because the large-scale monitoring environment is complex and changing and it consumes time and effort to manually extract the distinguishable event features of distributed optical fiber sensing signals in actual application, and providing a 1D-CNN-based ((one-dimensional convolutional neural network)-based) distributed optical fiber sensing signal feature learning and classification method.

The present invention adopts following technical solutions.

A 1D-CNN-based distributed optical fiber sensing signal feature learning and classification method comprises steps of:

(1), segmenting event signals acquired at all spatial points along a distributed optical fiber, and constructing a typical event signal dataset;

(2), extracting 1D-CNN distinguishable features of the event signals in the typical event signal dataset based on a well-trained one-dimensional convolutional neural network, and obtaining the event signal feature sets;

(3), training different classifiers with the event signal feature sets, and screening out an optimal classifier; and (4), after inputting test data into the well-trained one-dimensional convolutional neural network to extract distinguishable event features, inputting the distinguishable event features into the optimal classifier for classification.

Preferably, the step (1) comprises specific steps of:

(11), acquiring a spatial-temporal response signal matrix through phase-sensitive optical time domain reflectometry based on phase demodulation; and (12), segmenting the event signals along a time axis, which are one-dimensional time sequences at each spatial point in the spatial-temporal response signal matrix, and obtaining the typical event signal dataset containing various event signal training sets and test sets.

Preferably, the step (2) comprises specific steps of:

(21), constructing a one-dimensional convolutional neural network, and setting network parameters of the one-dimensional convolutional neural network;

(22), training the one-dimensional convolutional neural network obtained in the step (21);

(23), adjusting and optimizing the trained one-dimensional convolutional neural network; if the well-trained one-dimensional convolutional neural network is obtained after iteration is finished, executing step (24); otherwise, retraining the adjusted and optimized one-dimensional convolutional neural network, and then executing the step (23) again; and (24), inputting the event signals of the typical event signal dataset into the well-trained one-dimensional convolutional neural network for 1D-CNN distinguishable feature extraction, and obtaining the event signal feature sets.

Preferably, in the step (21), the constructed one-dimensional convolutional neural network includes ten layers, namely an input layer, a first convolution layer C1, a first pooling layer P1, a second convolution layer C2, a second pooling layer P2, a third convolution layer C3, a third pooling layer P3, a first fully connected layer FC1, a second fully connected layer FC2 and a softmax layer.

Preferably, the step (22) comprises specific steps of:

(221), initializing the network parameters of the one-dimensional convolutional neural network with a truncated normal distribution method at a starting point of network training, particularly comprising steps of: assuming that the network parameter θ obeys normal distribution, limiting a value of the network parameter θ within [a,b], and calculating the value of the corrected network parameter θ through a probability density function of:

$$f(\theta; u, \sigma, a, b) = \frac{\frac{1}{\sigma}\phi\left(\frac{\theta-u}{\sigma}\right)}{\Phi\left(\frac{b-u}{\sigma}\right) - \Phi\left(\frac{a-u}{\sigma}\right)}; \quad (2)$$

wherein $\varnothing(\cdot)$ represents a standard normal distribution function, u and σ respectively represent expectation and variance of standard normal distribution, and $\Phi(\cdot)$ represents a cumulative distribution function of the standard normal distribution; θ is valued within a known limited range and is generated from the probability density function; θ comprises a weight matrix W and a bias variable Bias, and serves as an initialized network parameter value; and (222), inputting the training sets into the one-dimensional convolutional neural network obtained in the step (221), and completing a forward propagation process to obtain a classified output of a fully connected network.

Preferably, the step (23) comprises specific steps of:

(231), calculating a cross entropy loss function C according to the classified output of the fully connected network, and estimating a distance between a true sample value and a predicted sample value according to a following formula of:

$$C = -\frac{1}{n}[y \ln a + (1-y)\ln(1-a)]; \quad (6)$$

wherein y, n and a respectively represent the predicted sample value, a total number of samples and the true sample value;

(232), after calculating an update gradient according to the cross entropy loss function C, updating a network weight, and optimizing through an Adam algorithm as follows:

$$g_t = \nabla_\theta C_t(\theta_{t-1}) \quad (7)$$

$$m_t = \mu * m_{t-1} + (1-\mu) * g_t \quad (8)$$

$$n_t = v * n_{t-1} * (1-v) * g_t^2 \quad (9)$$

wherein: in the formulas (7)-(9), $g_t$ represents a calculated target function gradient at a $t^{th}$ iteration, $m_t$ and $n_t$ respectively represent estimations of gradient first-order and second-order moments at the $t^{th}$ iteration, and μ and v ∈ [0,1) respectively represent exponential decay rates of the gradient first-order and second-order moments; and the CNN network parameter is updated according to a formula of:

$$\theta_t = \theta_{t-1} - \alpha * \frac{\hat{m}_t}{\sqrt{\hat{n}_t} + \varepsilon}; \quad (10)$$

wherein $$\hat{m}_t = \frac{m_t}{1-u^t} \text{ and } \hat{n}_t = \frac{n_t}{1-v^t}$$

are assumed at the $t^{th}$ iteration; α represents a learning rate, and ε is a very small number; and (233), updating the one-dimensional convolutional neural network with the network parameter θ, and testing with signal samples in the test sets; if the well-trained one-dimensional convolutional neural network is obtained after iteration is finished, executing the step (24); otherwise, retraining the adjusted and optimized one-dimensional convolutional neural network, and then executing the step (23) again.

Preferably, the step (3) comprises specific steps of:

(31), respectively constructing four classifiers, namely a support vector machine (SVM) classifier, a decision tree (DT) classifier, a random forest (RF) classifier and an extreme gradient boosting (XGB) classifier; and (32), classifying the event signal feature sets by each classifier, measuring a classification result of each classifier according to a confusion matrix, a classification precision, a recall ratio and an F-score indicator, and screening out the optimal classifier.

Preferably, the step (32) comprises specific steps of:

(321), classifying the event signal feature sets by each classifier to obtain classification results;

(322), evaluating and comparing the classification results of the different classifiers according to the confusion matrix of the classification results;

(323), calculating the classification precision, the recall ratio and the F-score indicator according to the classification results, so as to measure performances of the different classifiers; wherein specific formulas are as follows:

$$\text{Precision} = \frac{TP}{TP+FP}; \quad (11)$$

$$\text{Recall} = \frac{TP}{TP+FN}; \quad (12)$$

$$F-\text{score} = \frac{2*TP}{2*TP+FP+FN}; \quad (13)$$

wherein Precision represents the precision ratio, Recall represents the recall ratio, F-score is a comprehensive indicator of the precision ratio and the recall ratio, TP, FP, FN and TN respectively represent the correctly judged number of a certain event type, the number of A wrongly judged as other event types, the number of other event types judged as A and the number of other event types judged as other than A; and (324), comprehensively evaluating and comparing the classification results of the different classifiers based on the classification result and the performance of each classifier, and screening out the optimal classifier.

Preferably, the step (4) comprises specific steps of:

(41), segmenting the time sequences acquired at all the spatial points according to a sample signal length prepared in a database;

(42), inputting the segmented time sequences into the well-trained one-dimensional convolution neural network, and taking 1D-CNN features automatically extracted in the first fully connected layer FC1 as the distinguishable event features; and (43), inputting the distinguishable event features into the optimal classifier to obtain the classification result.

To sum up, through adopting the above technical solutions, the present invention has following advantages.

Firstly, a large event database is built through massive data collected on site by designing a deep convolution neural network (CNN) and is used for training and optimizing the structure of a learning network and realizing deep mining of typical event signal features along a distributed optical fiber; the distinguishable features of different types of event signals are automatically extracted to replace manually extracted distinguishable features for identification and classification; the identification accuracy of various types of typical events is high, the algorithm update speed is fast, and the identification effect is better than the classification results based on manually extracted features.

Secondly, when the event object to be analyzed is one-dimensional acoustic or vibration sensing signals of distributed optical fiber sensors, the differences between the present invention and other CNN-based methods lie in that: the existing CNN-based methods for identifying one-dimensional signals always need time-frequency transformation to transform the one-dimensional signals into two-dimensional signals, and then, the two-dimensional convolution neural network (2D-CNN) structure frequently used in image processing is used for identification and classification; and the one-dimensional convolution neural network (1D-CNN) structure suitable for the time sequence structure of distributed optical fiber sensing signals is specially designed in the present invention, so that the computational complexity is reduced and the learning effect is better.

Thirdly, in the present invention, the fully connected layer of the CNN network is not directly used for classification, only the CNN network is used for replacing the manual feature extraction process, so that automatic learning and fast extraction of distinguishable features of typical events in complex and changing environment conditions are realized; by taking the features obtained through the learning of the CNN network as inputs and designing classifiers such as support vector machine (SVM), decision tree (DT), random forest (RF) and eXtreme gradient boosting (XGB) classifiers, the classifier with the optimal classification performance is selected as the final classifier, the sensing signals at each spatial point in the entire monitoring range are automatically identified online, and the trouble of adjusting parameters caused by direct adoption of the CNN network for classification is effectively avoided.

BRIEF DESCRIPTION OF THE DRAWINGS

FIG. 3 shows spatial-temporal response signals of the distributed optical fiber acoustic and vibration sensing system obtained through accumulation along a time axis according to the second preferred embodiment of the present invention.

FIG. 4 shows a dataset for various typical event signals in pipeline safety constructed based on signal samples collected on site according to a third preferred embodiment of the present invention.

FIG. 5 is a structural diagram of the one-dimensional convolution neural network according to a fourth preferred embodiment of the present invention.

FIG. 6 shows description of structure parameters of the one-dimensional convolution neural network according to the fourth preferred embodiment of the present invention.

FIG. 7 is a classification schematic diagram of a support vector machine (SVM) classifier according to a fifth preferred embodiment of the present invention.

FIG. 14 shows a F-score comparison of the classification of the support vector machine (SVM), decision tree (DT), random forest (RF) and eXtreme gradient boosting (XGB) classifiers based on the 1D-CNN features according to the fifth preferred embodiment of the present invention.

FIG. 15 shows manually extracted features according to the fifth preferred embodiment of the present invention.

FIG. 17 and FIG. 18 are classification result diagrams of online test based on the support vector machine (SVM) classifier according to a sixth preferred embodiment of the present invention.

DETAILED DESCRIPTION OF THE PREFERRED EMBODIMENT

To make the purpose, technical solutions and advantages of the present invention clearer, the present invention will be further illustrated in detail with the accompanying drawings and embodiments. It should be understood that the embodiments described herein are used only to explain rather than limit the present invention.

In recent years, the deep learning algorithm based on a convolutional neural network (CNN) has been able to solve the problem of identifying complex images and voices and has successfully applied in feature learning and fault diagnosis of sensing signals. Therefore, the present invention proposes a 1D-CNN-based distributed optical fiber sensing signal feature leaning and classification method based on a deep conventional neural network. Event acoustic or vibration signals collected on site are used to train the CNN network in a data-driven manner, i.e. to learn the distinguishable signal features of various event types, and the network can automatically extract the distinguishable signal features of learned events once the training reaches the optimal result; finally, the identification and classification of various typical event signals in different field environments are achieved by designing an appropriate classifier. The method has the advantages of effectively improving the adaptive ability and the identification accuracy of the system in complex noise environment, updating the algorithm easily, omitting the time-consuming and arduous process of manual feature extraction and classification, having identification rate better than the classification results of manually extracted features, being conducive to the large-scale application of optical fiber sensing and having a huge potential application value. The specific description is as follows.

First Preferred Embodiment

Figure 1:
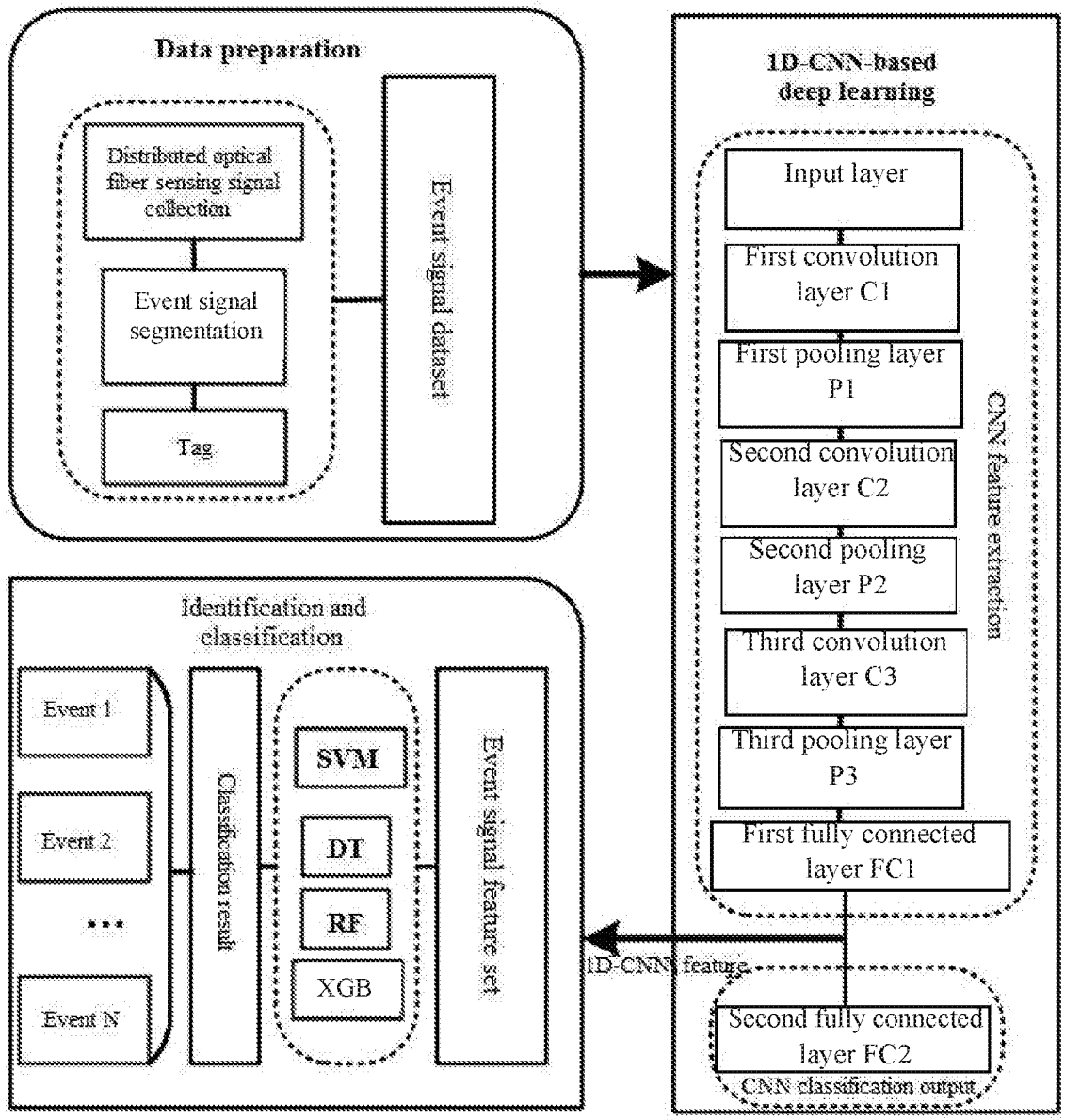
FIG. 1 is a signal processing flow chart of a distributed optical fiber acoustic and vibration sensing signal feature learning and classification method based on a one-dimensional conventional neural network (1D-CNN) according to a first preferred embodiment of the present invention.

Take the application of the distributed optical fiber acoustic and vibration sensing signal feature learning and classification method based on a one-dimensional conventional neural network (1D-CNN) in long-distance pipeline safety monitoring for instance. As shown in FIG. 1, the whole signal processing flow is mainly divided into three parts.

Part 1: Data Preparation

Acoustic or vibration signals (i.e. distributed optical fiber sensing signals) along the pipeline against complex background environment of actual application site are collected with the distributed optical fiber acoustic and vibration sensing system hardware based on the phase-sensitive optical time domain reflectometer, time sequences of the pipeline event signals collected at all spatial points by the time period are segmented, and a typical event signal dataset is constructed.

Part 2: Constructing a One-Dimensional Conventional Neural Network and Conducting Deep Learning and Feature Extraction of Typical Event Signals A one-dimensional conventional neural network, referred to as 1D-CNN, is firstly constructed; the constructed one-dimensional conventional neural network is trained by taking signals in the typical event signal dataset as inputs; and after optimizing the one-dimensional conventional neural network through iterative adjustment, the outputs of the first fully connected layer FC1 at the rear end of the network are taken as the 1D-CNN distinguishable features of typical event signals obtained through deep learning.

Part 3: Identification and Classification

After constructing the event signal feature sets through the 1D-CNN distinguishable features learned by the 1D-CNN network from the typical event signals, the support vector machine (SVM), decision tree (DT), random forest (RF), eXtreme gradient boosting (XGB), etc. are trained to identify and classify the typical event signals respectively.

The optimal classifier is screened out according to the confusion matrix of classification results and the classification performance indicator parameters such as classification precision, recall ratio and F-score, and the optimal classifier is taken as the final classifier of online test process for online classification and identification. During the test process, the test data are segmented and input into the optimal 1D-CNN network to obtain distinguishable event features, and the distinguishable event features are further input into the optimal classifier to obtain the classification result.

Second Preferred Embodiment

Figure 2:
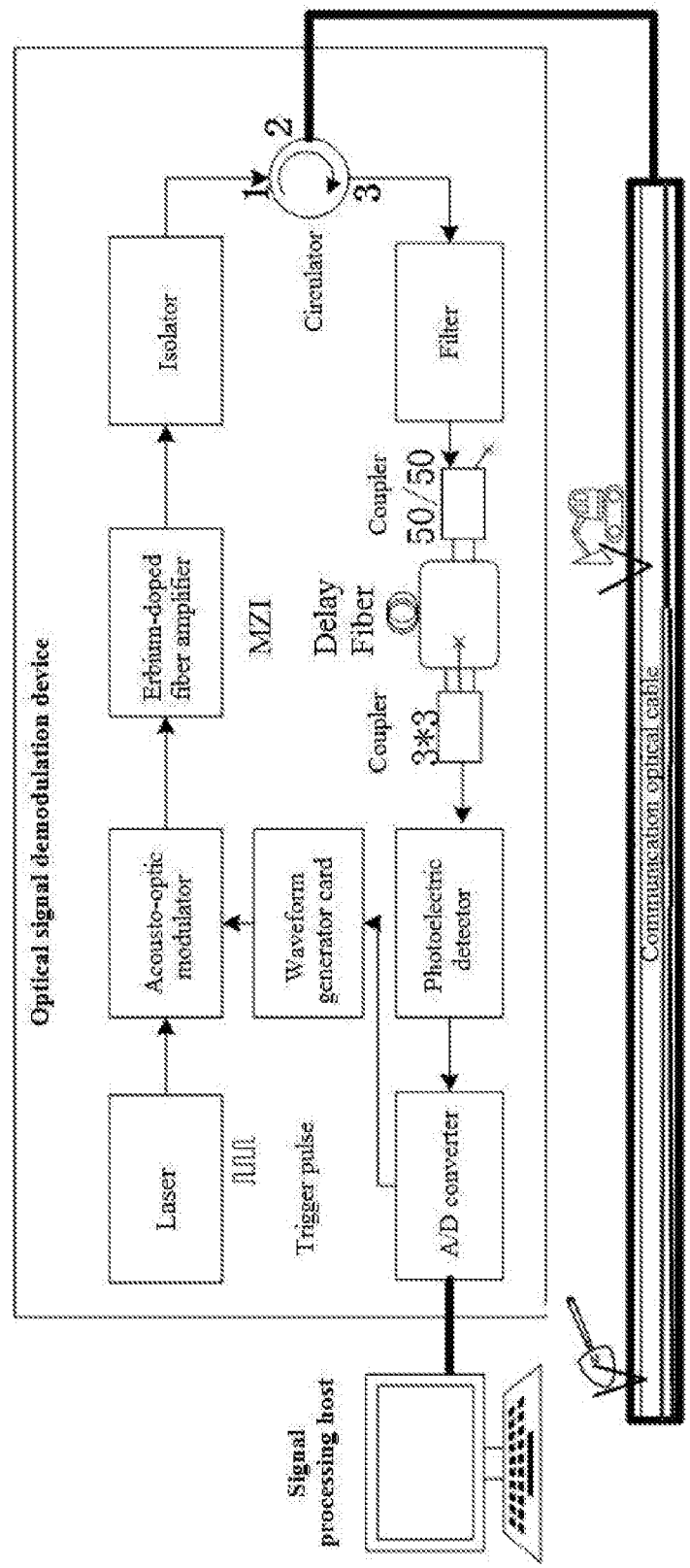
FIG. 2 is a structural and schematic diagram of a distributed optical fiber acoustic and vibration sensing system based on a phase-sensitive optical time domain reflectometer according to a second preferred embodiment of the present invention.

The system hardware for signal collection in the first preferred embodiment is a distributed optical fiber acoustic and vibration sensing system with phase-sensitive optical time domain reflectometry (Φ-OTDR) based on phase demodulation, and the structure and the working principle of the system are shown in FIG. 2. The system hardware is composed of three parts, namely optical detection cable, optical signal demodulation equipment and signal processing host. The optical detection cable is usually a common single-mode communication optical fiber and is generally laid and buried along underground pipelines, power transmission cables or city roads; alternatively, unoccupied fiber cores of communication optical cables laid along pipelines or roads can be directly utilized. The optical signal demodulation equipment is the core of the system, and the internal components mainly include optical devices and electrical devices. One path of continuous coherent optical signals is generated by an ultra-narrow linewidth laser and modulated into optical pulse signals through an acousto-optic modulator or an photoelectric modulator, then the optical pulse signals are centrally amplified by an erbium-doped fiber amplifier (EDFA), and the amplified optical pulse signals are injected into the optical detection cable successively through an isolator and a first port and a second port of a circulator. The optical pulse signals produce Rayleigh scattering during transmission along the optical cable, then the back Rayleigh scattering optical signals return along the optical cable to be received by the second port and a third port of the circulator, and after filtering out noise signals by an optical filter and coupling by a first coupler, the optical pulse signals are injected into an unbalanced Mach-Zehnder interferometer or Michelson interferometer, etc. The detail will be determined according to the demodulation method. Three paths of phase change information introduced by external disturbance with phase difference of 120 degrees are output through 3*3 second couplers; then the actuating signals of acoustic waves and vibrations on the optical fiber can be obtained; the demodulated optical signals are converted into electrical signals through a photoelectrical detector; synchronous signal collection is conducted by a synchronous-trigger analog-to-digital converter controlled by a waveform generation card; and finally, the digital electrical signals are transmitted into the signal processing host through interfaces such as network in real time. The signal processing host is a common computer host or an FPGA/DSP (field-programmable gate array/digital signal processor) embedded motherboard and is used for analyzing and processing signals detected by the optical fiber, for obtaining the event information of acoustic waves, vibrations, etc. through specific signal processing algorithms, for determining event locations through the optical time domain reflection principle and for intelligently analyzing, processing, identifying and classifying the sensed events.

The system returns raw signal trajectories distributed along space at each moment, consecutively accumulates T raw signal trajectories along the time axis and constructs a spatial-temporal signal matrix with time T dimension and space S dimension that:

$$\{XX = x_{ts}(t=1,2,\ldots,T; s=1,2,\ldots,S)\} \quad (1);$$

wherein T represents the time sampling length, S represents the space sampling length, both in sampling points; the spatial-temporal response signals obtained by the distributed optical fiber acoustic and vibration sensing system through time accumulation are shown in FIG. 3; the horizontal axis is a space axis and represents the spatial points of data collection along the pipeline, and the distance between two spatial points is ΔS; the vertical axis is a time axis, the sampling interval of two sampling points is $\Delta T = 1/f_s$, and $f_s$ is the pulse trigger frequency on the time axis, namely time sampling frequency.

Third Preferred Embodiment

Event signals in rows along the time axis are segmented according to the one-dimensional time sequences at each spatial point in the spatial-temporal response signal matrix accumulated in the second preferred embodiment, and a typical event signal dataset raw_data is constructed. In the present invention, a pipeline safety related typical event signal dataset raw_data is constructed by taking pipeline safety monitoring as an example. The specific operating process comprises steps of: successively intercepting event signals with time length L against the signal time sequences at each spatial point, as shown in the rectangular frame part of FIG. 3, taking the event signals as event signal samples, denoted as $X_1, X_2 \ldots$, and respectively attaching labels according to actual event types.

During pipeline safety monitoring, typical event types usually include: stationary environmental noise, human digging, mechanical excavation, vehicle interference and factory interference easy to be misjudged, etc. In the third preferred embodiment, stationary environment noise is called as a normal event, and the label is set as 1; human digging, mechanical excavation, vehicle interference, factory interference, etc. are called as abnormal events, wherein human digging and mechanical excavation are real abnormal events, the label of human digging is set as 2, and the label of mechanical excavation is set as 3; vehicle interference and factory interference belong to environmental interference events, the label of vehicle interference is set as 4, and the label of factory interference is set as 5. The labels are respectively added into a database according to event types, so as to complete the construction of a training dataset for five types of typical event signals; and the entire dataset is divided into a training set raw_train and a test set raw_test according to the conventional proportion of 7:3. The dataset for various types of typical events, which is constructed based on signal samples collected on pipeline safety monitoring site, is shown in FIG. 4, and the information such as the signal sample number of various event signal training sets and test sets is included.

Fourth Preferred Embodiment

A 1D-CNN deep learning network structure is constructed and trained based on the typical event dataset obtained in the third preferred embodiment, and the conversion from raw data to features is completed through four steps of designing the 1D-CNN structure and setting network structure parameters, training the network, adjusting and optimizing the network, and outputting 1D-CNN features. The specific method is described as follows.

(1) Designing the 1D-CNN Structure and Setting Network Structure Parameters

The present invention adopts a network structure having ten layers, respectively an input layer, a first convolution layer C1, a first pooling layer P1, a second convolution layer C2, a second pooling layer P2, a third convolution layer C3, a third pooling layer P3, a first fully connected layer FC1, a second fully connected layer FC2 and a softmax layer, as shown in FIG. 5. The setting of specific network structure parameters is shown in FIG. 6.

(2) Training the Network

A predicted label of training data raw_train is obtained through the one-dimensional convolution neural network (1D-CNN) with parameters setting and is compared with the true label of the sample to obtain a loss value, so that a gradient is calculated thereby to update a network parameter θ. The network parameter θ comprises a weight matrix TV and a bias variable Bias. The first network parameter updating process is taken for instance as follows.

1) Initializing the Network Parameter θ

The initialized state decides the starting point of network training. To make the network easy to converge, the truncated normal distribution method is used for initializing the network parameter. The specific method comprises steps of: assuming that the network parameter θ obeys normal distribution, limiting the value of the network parameter θ within [a, b], and calculating the value of the corrected network parameter θ through the probability density function of:

$$f(\theta; u, \sigma, a, b) = \frac{\frac{1}{\sigma}\phi\left(\frac{\theta - u}{\sigma}\right)}{\Phi\left(\frac{b - u}{\sigma}\right) - \Phi\left(\frac{a - u}{\sigma}\right)}; \quad (2)$$

wherein ∅(•) represents standard normal distribution function, u and σ respectively represent the expectation and variance of standard normal distribution, and Φ(•) represents the cumulative distribution function of standard normal distribution; θ which is valued within the known limited range is generated from the probability density function; θ comprises a weight matrix W and a bias variable Bias, and serves as the initialized network parameter value.

2) Inputting the Typical Event Signal Dataset to Complete the Forward Propagation Process For convolution layers, the first convolution layer C1 is taken for instance. The number of convolution kernels in C1 is M, the size is assumed as m, and each convolution kernel needs K convolutions. One input training data is assumed as $X_i = \{x_1, x_2 \ldots x_L\}$, wherein $X_i$ belongs to raw_train; the initialized weight matrix of the $j^{th}$ convolution kernel is assumed as $W_j = [W_{j1}, W_{j2} \ldots W_{jm}]$; and the bias vector is $Bias_j$. n data in $X_i$ is convoluted each time starting from the first data, and the results after nonlinear activation is obtained through the rectified linear unit (referred to as ReLU) that:

$$Conv_{jk} = ReLU([x_i, x_{i+1} \ldots x_{i+n}] \cdot [W_{j1}, W_{j2} \ldots W_{jm}] + Bias_j) \quad (3);$$

wherein i, j, k, L and M respectively represent the $i^{th}$ data point, $j^{th}$ convolution kernel, the $k^{th}$ convolution, the size of input data and the size of the convolution kernel.

The ReLU activation function adopted in the formula (3) is:

$$ReLU = \max(x, 0) \quad (4).$$

In such way, the starting point of next convolution moves by step size $S_{conv}$ data points. Each data $X_i$ passes M convolution kernels, and the output of the first convolution layer C1 obtained after each kernel is convoluted for K times is Conv1=[Conv$_1$, Conv$_2$ ... Conv$_j$ ... Conv$_M$], wherein Conv$_j$=[Conv$_{j1}$, Conv$_{j2}$ ... Conv$_{jk}$ ... Conv$_{jK}$].

For pooling layers, the first pooling layer P1 is taken for instance. As shown in FIG. 5, each kernel in P1 is in one-to-one correspondence to the convolution kernel in the first convolution layer C1, the number of kernels is M, the size is assumed as p, and each kernel needs P times of pooling. The maximum pooling manner is chosen for pooling, the input of the first pooling layer is Conv1, and the $j^{th}$ kernel pools the $j^{th}$ vector in Conv1. Starting from the first data point, the movement step length is assumed as $S_{pool}$ data points. The process is as follows:

$$Pool_j = [\max(Conv_{j1} \ldots Conv_{jp}) \ldots \max(Conv_{j(1+S_{pool})} \ldots Conv_{j(1+S_{pool}+p)}) \ldots ] \quad (5).$$

In such way, after the pooling of all kernels is completed, the final output of the first pooling layer P1 is Pool1=[Pool$_1$, Pool$_2$ ... Pool$_j$ ... Pool$_M$]. Similarly, a two-dimensional array is obtained after passing through the second convolution layer C2, the second pooling layer P2, the third convolution layer C3 and the third pooling layer P3, then is converted into a one-dimensional array and input into a fully connected network composed of a first fully connected layer FC1 and a second fully connected layer FC2 to obtain classification output. The output of the first fully connected layer FC1 is a vector H=[h$_1$, h$_2$ ... h$_T$], and the output vector of the second fully connected layer FC2 is y=[y$_1$, y$_2$ ... y$_N$], where T and N respectively represent the number of neurons and the number of event types in FC1. It is noted that the classification output of the fully connected network in the present invention is only used for network adjustment and optimization. To avoid complex adjustment of classification parameters and improve algorithm efficiency, the output vector H=[h$_1$, h$_2$ ... h$_T$] of FC1 is finally taken as extracted 1D-CNN features, and other classifiers are used for identification and classification.

(3) Adjusting and Optimizing the Network

The loss function is calculated according to the classification output obtained in the step (2), so as to continue to update, adjust and optimize the constructed CNN network. The specific steps are described as follows.

1) Calculating the cross entropy loss function C based on the classification output, and estimating the distance between the true sample value and the predicted sample value through a following formula of:

$$C = -\frac{1}{n}[y \ln a + (1-y)\ln(1-a)]; \quad (6)$$

wherein y, n and a respectively represent the predicted sample value, the total number of samples and the true sample value.

2) Calculating the update gradient according to the cross entropy loss function C, updating the network weight obtained through training, and optimizing through the Adam algorithm as follows:

$$g_t = \nabla_\theta C_t(\theta_{t-1}) \quad (7);$$

$$m_t = \mu * m_{t-1} + (1-\mu) * g_t \quad (8);$$

$$n_t = v * n_{t-1} * (1-v) * g_t^2 \quad (9);$$

wherein in the formulas (7)-(9), $g_t$ represents the calculated target function gradient at the $t^{th}$ iteration, $m_t$ and $n_t$ respectively represent estimations of gradient first-order and second-order moments at the $t^{th}$ iteration, and $\mu$ and $v \in [0,1)$ respectively represent the exponential decay rates of the gradient first-order and second-order moments; and the CNN network parameter is updated according to the formula (10) of:

$$\theta_t = \theta_{t-1} - \alpha * \frac{\hat{m}_t}{\sqrt{\hat{n}_t} + \varepsilon}; \quad (10)$$

wherein $$\hat{m}_t = \frac{m_t}{1-\mu^t} \text{ and } \hat{n}_t = \frac{n_t}{1-v^t}$$

are assumed at the $t^{th}$ iteration, $\alpha$ represents the learning rate, and $\varepsilon$ is a very small number to prevent dividing by zero.

After updating the one-dimensional convolutional neural network with the network parameter $\theta$, signal samples of test set raw_test are used to test. If iteration is not finished, iteration is continued until the set maximum iteration time is reached. The model with the best test result is saved as the final deep leaning mode, and marked as CNN-Model.

(4) Outputting 1D-CNN Features

Based on the final deep learning model CNN-Model, the output H of the first fully connected layer FC1 is taken as the input of later classifier, and marked as 1D-CNN feature vector.

All raw data $R_x$ in the raw dataset raw_data (typical event signal dataset) pass the well-trained deep learning model CNN-Model to obtain corresponding feature data $R_y$, and a 1D-CNN feature set feature_data corresponding to the raw dataset raw_data is constricted therefrom.

Fifth Preferred Embodiment

The typical event signal 1D-CNN feature set feature_data obtained in the fourth preferred embodiment is divided into a feature training set feature_train and a feature test set feature_test according to a normal proportion of 7:3; the support vector machine (SVNt), decision tree (DT), random forest (RF) and eXtreme gradient boosting (XGB) classifiers are respectively trained, and the optimal classifier is chosen according to the classification results of different classifiers. Meanwhile, the effectiveness of 1D-CNN distinguishable features extracted based on the method in the present invention is compared, evaluated and verified by comparing the classification results based on 1D-CNN distinguishable features and those based on manual features.

Figure 8:
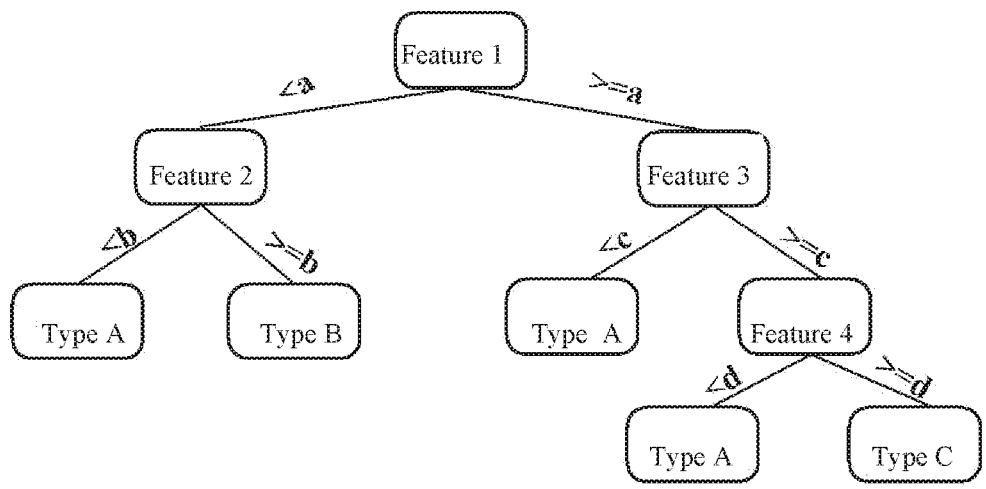
FIG. 8 is a classification schematic diagram of a decision tree (DT) classifier according to the fifth preferred embodiment of the present invention.
Figure 9:
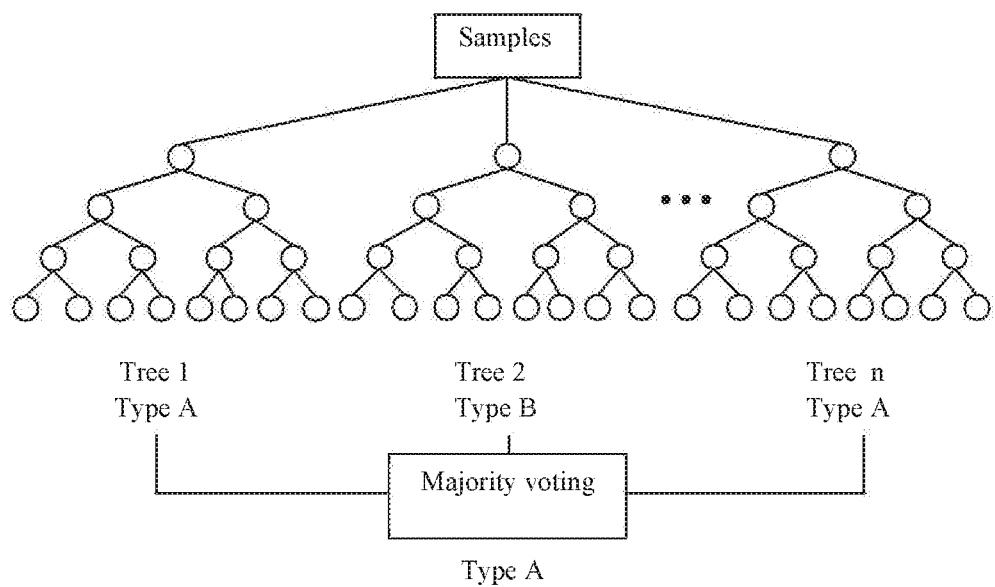
FIG. 9 is a classification schematic diagram of a random forest (RF) classifier according to the fifth preferred embodiment of the present invention.
Figures 10, 11:
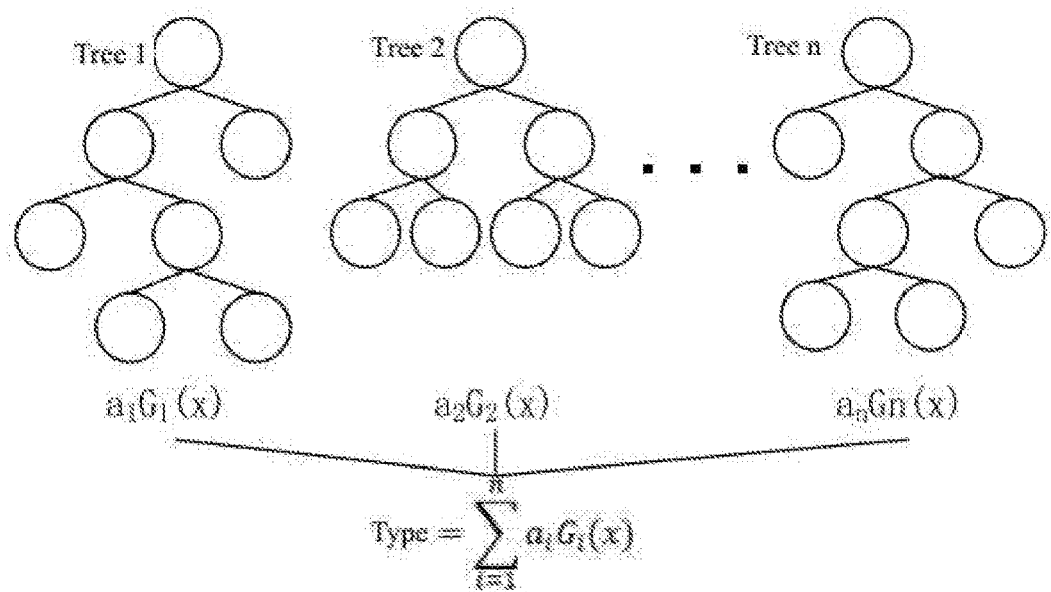
FIG. 10 is a classification schematic diagram of an eXtreme gradient boosting (XGB) classifier according to the fifth preferred embodiment of the present invention.
FIG. 11 shows a comparison of confusion matrices for classification of the support vector machine (SVM), decision tree (DT), random forest (RF) and eXtreme gradient boosting (XGB) classifiers based on 1D-CNN features according to the fifth preferred embodiment of the present invention.

The method comprises the following specific steps of:

(1), respectively constructing the following four classifiers, namely support vector machine (SVM), decision tree (DT), random forest classifier (RF) and eXtreme gradient boosting (XGB) classifiers; wherein:

the support vector machine (SVM) classifier maps data to a higher-dimensional space through a kernel function and distinguishes the data through a hyperplane, and the classification principle is shown in FIG. 7;

the decision tree (DT) classifier model has a tree structure and represents the process of classifying instances based on features in a classification problem; the decision tree (DT) classifier can be considered as the set of if-then rules and completes classification based on the feature value range; the classification principle of the decision tree (DT) classifier is shown in FIG. 8;

the random forest (RF) classifier completes classification by constructing multiple decision trees and conducting majority voting, and the classification principle is shown in FIG. 9; and the eXtreme gradient boosting (XGB) classifier is based on the decision tree and completes classification by the lifting scheme and weighted voting, and the classification principle is shown in FIG. 10;

(2), classifying and evaluating 1D-CNN distinguishable features obtained by the deep learning network, specifically comprising steps of:

respectively inputting the 1D-CNN distinguishable features obtained in the fourth preferred embodiment into the support vector machine (SVM), decision tree (DT), random forest classifier (RF) and eXtreme gradient boosting (XGB) classifiers; measuring the classification results of different classifiers according to the confusion matrix of classification results and the classification performance indicator parameters such as classification precision, recall ratio and F-score; and finally, comparing the classification results with the classification result corresponding to manual features.

1) Evaluating and comparing the classification results of different classifiers according to the confusion matrix of classification results. The confusion matrix visually and clearly reflects the classification performance and the confusion degree of different types of events. For the classification result of five types of typical pipeline safety monitoring events based on the 1D-CNN distinguishable features obtained based on the deep learning network, the confusion matrix representation form is shown in FIG. 11. In the FIG. 11, row represents true event type, line represents predicted event type, the diagonal line represents the proportion of correctly judged sample size of certain event type to the total sample size of the event type. All the classifiers adopt the 1D-CNN features obtained by the deep learning network constructed in the present invention to classify. Except the factory interference event type 5, the classification precisions of the other four event types are all above 90%; the classification precision of the support vector machine (SVM) and eXtreme gradient boosting (XGB) classifiers is the highest as for these five typical event types and above 90%, which proves the effectiveness of classification based on the 1D-CNN features extracted in the present invention.

2) Comprehensively measuring the performance of different classifiers according to the classification precision, recall ratio and F-score The calculations are respectively shown in formulas (11)-(13) that:

$$Precision = \frac{TP}{TP+FP}; \quad (11)$$

$$Recall = \frac{TP}{TP+FN}; \quad (12)$$

-continued $$F-score = \frac{2*TP}{2*TP+FP+FN}; \quad (13)$$

wherein TP, FP, FN and TN respectively represent the correctly judged number of certain event type (such as event A), the number of A wrongly judged as other event types, the number of other event types judged as A and the number of other event types judged as other than A.

Figure 12:
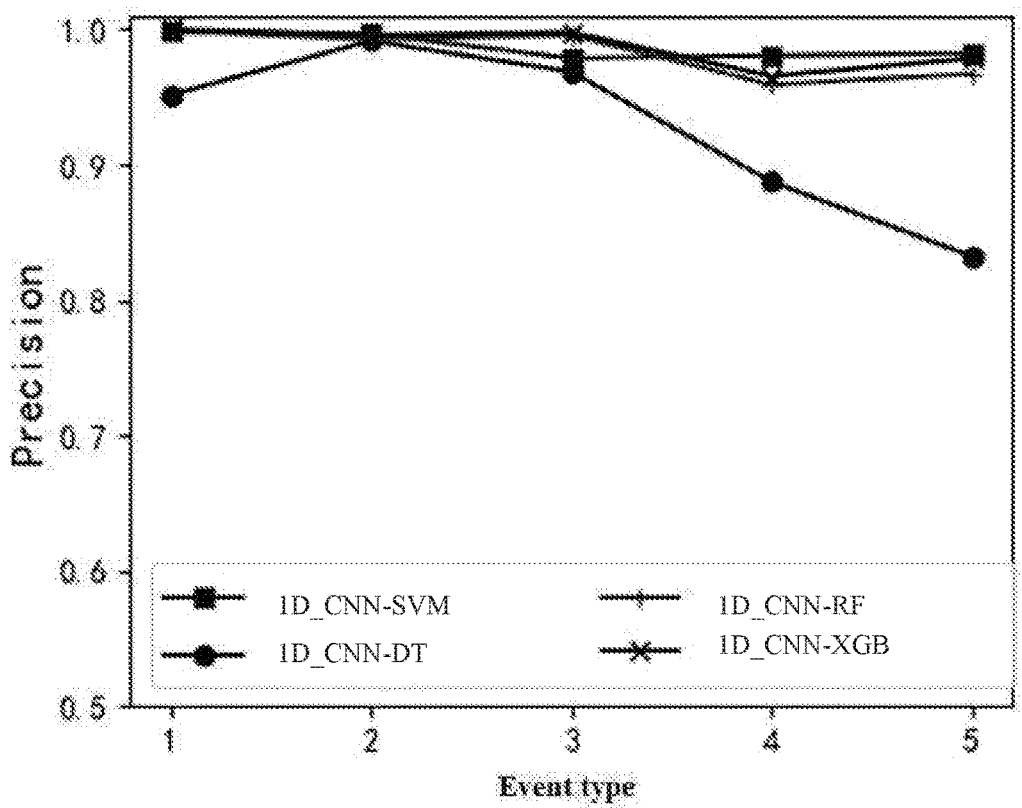
FIG. 12 shows a precision comparison of the classification of the support vector machine (SVM), decision tree (DT), random forest (RF) and eXtreme gradient boosting (XGB) classifiers based on the 1D-CNN features according to the fifth preferred embodiment of the present invention.
Figure 13:
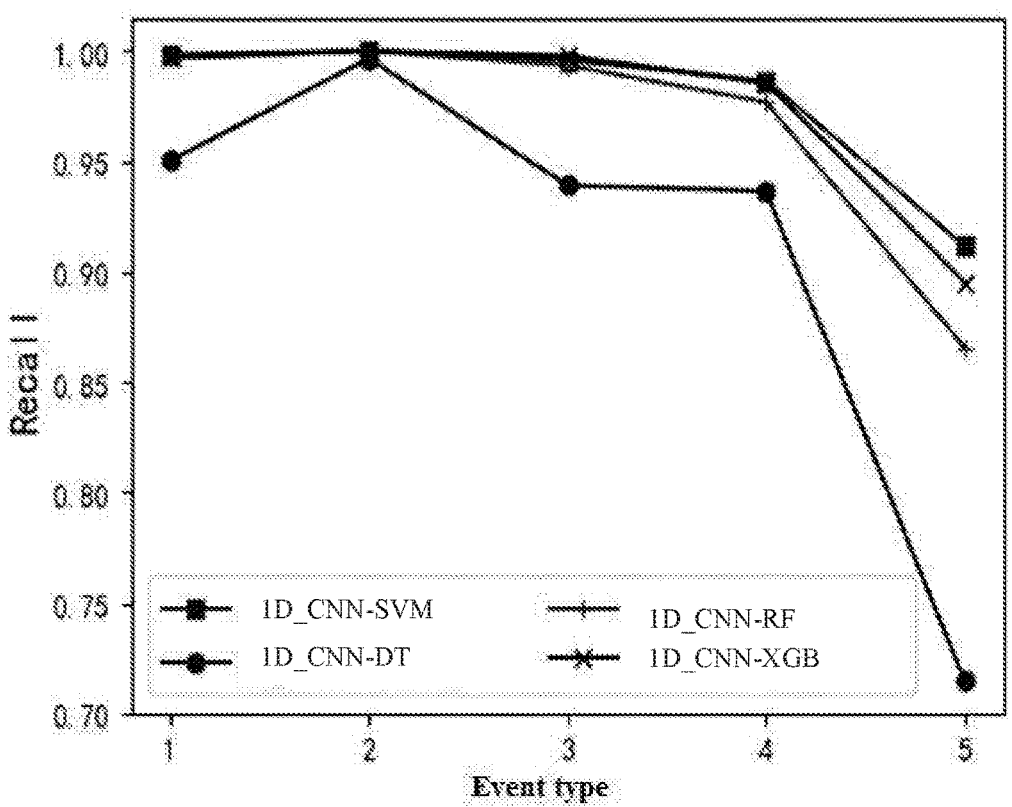
FIG. 13 shows a recall ratio comparison of the classification of the support vector machine (SVM), decision tree (DT), random forest (RF) and eXtreme gradient boosting (XGB) classifiers based on the 1D-CNN features according to the fifth preferred embodiment of the present invention.

The comparisons of three indicators for the classification results of five typical event types based on the 1D-CNN distinguishable features obtained by the deep learning network proposed in the present invention are respectively shown in FIG. 12-FIG. 14. The classification results in FIG. 12-FIG. 14 show that the performance indicators such as classification precision, recall ratio and F-score of the support vector machine (SVM), random forest and eXtreme gradient boosting (XGB) classifiers are better than those of the decision tree classifier, the classification precision for five typical event types is above 95%, the F-score comprehensive performance of the support vector machine (SVM) classifier is the best, and the classification result for five typical event types is above 95%. Therefore, the SVM classifier is chosen as the optimal classifier in the present invention by synthesizing the evaluation indicators of all classification results.

On the whole, for different classifiers, the classification results of the first three event types 1, 2 and 3 are better than those of the events 4 and 5, which indicate that the classifiers can effectively identify basic events such as background environment, human digging and mechanical excavation based on the 1D-CNN distinguishable features extracted by the deep learning network in the present invention and only confuse part of interferences such as two event types of traffic interference and factory interference.

Classification Result Comparison Between 1D-CNN Features and Manual Features

Figure 16:
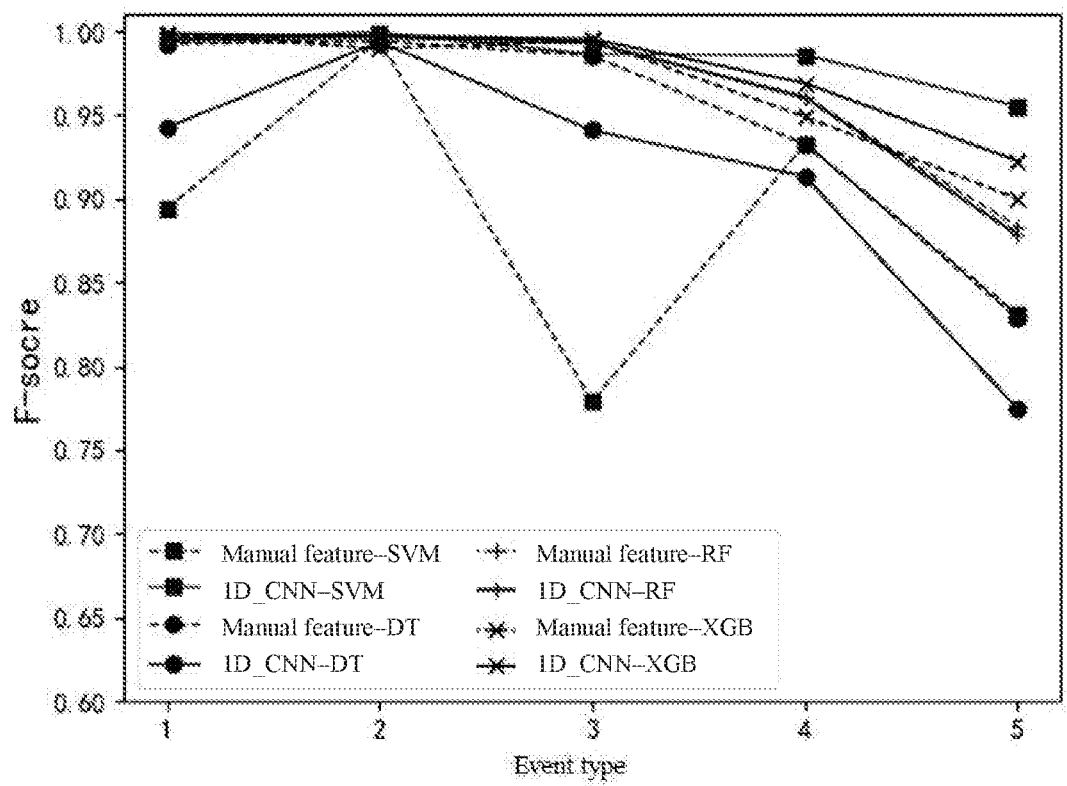
FIG. 16 is a F-score comparison diagram of the classification of the support vector machine (SVM), decision tree (DT), random forest (RF) and eXtreme gradient boosting (XGB) classifiers based on manual features and the 1D-CNN features respectively according to the fifth preferred embodiment of the present invention.

In order to fully verify the effectiveness of the 1D-CNN distinguishable features extracted in the present invention, the classification result based on manually extracted features is compared. The list of specific features extracted based on the manual method is shown in FIG. 15 and includes multidimensional pipeline event signal features in time domain, frequency domain, transform domain and cepstrum domain. For the four algorithms of support vector machine (SVM), decision tree (DT), random forest (RF) and eXtreme gradient boosting (XGB) classifiers, the $1^7$-scores of the classification results based on two feature types are compared, as shown in FIG. 16. The comparison result shows that except decision tree (DT) classifier, the classification results of the other three classification methods based on the 1D-CNN features extracted by the method in the present invention are better than the classification results based on manually extracted multidimensional features. When the random forest classifier is used, the classification results based on two feature types are similar. The result further indicates that the 1D-CNN features extracted by the method in the present invention can realize effective classification and identification.

Sixth Preferred Embodiment

The optimal classifier is selected according to the test results in the fifth preferred embodiment. For instance, the support vector machine (SVM) classifier is finally selected as an online test classifier for online identification and classification.

Figure 17:
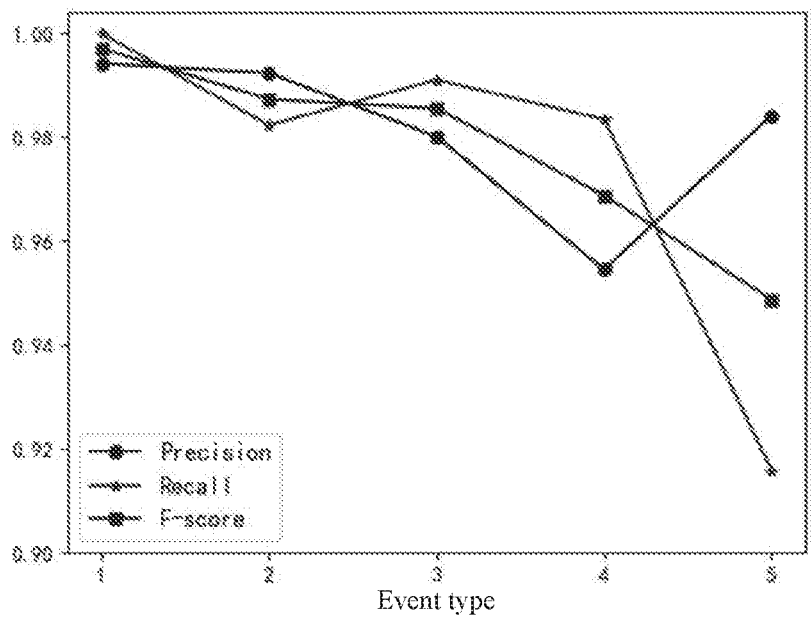

The time sequences obtained at all spatial points by the distributed optical fiber acoustic and vibration sensing system are segmented according to the length of the sample signal prepared in the database, then the segmented one-dimensional signals are input into the constructed 1D-CNN network, and automatically extracted 1D-CNN features at the first fully connected layer FC1 are obtained as distinguishable event features; the 1D-CNN features extracted by the network are input into the SVM classifier to generate its output, i.e. the results of online identification and classification, with the results of classification as shown in FIGS. 17 and 18. Based on the features extracted by the 1D-CNN network, the overall identification rate of events of the five types reaches above 98% on average.

The foregoing are only some preferred embodiments of the present invention without an intention of limiting the present invention. Any changes, equivalent replacements or improvement within the spirit and principles of the present invention to should fall within the protection of the present invention.

What is claimed is:

1. A 1D-CNN-based ((one-dimensional convolutional neural network)-based) distributed optical fiber sensing signal feature learning and classification method, comprising steps of:
   (1), segmenting event signals of acquired at all spatial points along a distributed optical fiber, and constructing an event signal dataset;
   (2), extracting 1D-CNN features of the event signals in the event signal dataset based on a trained 1D-CNN, and obtaining event signal feature sets; wherein the step (2) comprises specific steps of:
   (21), constructing a 1D-CNN, and setting network parameters of the 1D-CNN;
   (22), training the 1D-CNN obtained in the step (21); wherein the step (22) comprises specific steps of:
   (221), initializing the network parameters of the 1D-CNN with a truncated normal distribution method based on a starting point of network training, particularly comprising steps of: establishing that the network parameter θ obeys normal distribution, limiting a value of the network parameter θ within [a, b]; and calculating the value of the corrected network parameter θ through a probability density function of:

$$f(\theta; u, \sigma, a, b) = \frac{\frac{1}{\sigma}\phi\left(\frac{\theta - u}{\sigma}\right)}{\Phi\left(\frac{b - u}{\sigma}\right) - \Phi\left(\frac{a - u}{\sigma}\right)}; \quad (2)$$

wherein Ø(•) represents a standard normal distribution function, u and σ respectively represent expectation and variance of standard normal distribution, and Φ(•) represents a cumulative distribution function of the standard normal distribution; θ which is valued within a known limited range is generated from the probability density function; θ comprises a weight matrix W and a bias variable Bias, and serves as an initialized network parameter value; and (222), inputting training sets into the 1D-CNN obtained in the step (221), and completing a forward propagation process to obtain a classified output of a fully connected network;
   (23), adjusting and optimizing the trained 1D-CNN; if the trained 1D-CNN is obtained after iteration is finished, executing step (24); otherwise, retraining the adjusted and optimized 1D-CNN, and then executing the step (23) again; and
   (24), inputting the event signals of the event signal dataset into the trained 1D-CNN for 1D-CNN distinguishable feature extraction, and obtaining the event signal feature sets;
   (3), training different classifiers with the event signal feature sets, and screening out classifier; and
   (4), after inputting test data into the trained 1D-CNN to extract distinguishable event features, inputting the distinguishable event features into the classifier for classification.

2. The 1D-CNN-based distributed optical fiber sensing signal feature learning and classification method, as recited in claim 1, wherein the step (1) comprises specific steps of:
   (11), acquiring a spatial-temporal response signal matrix through phase-sensitive optical time domain reflectometry based on phase demodulation; and
   (12), segmenting the event signals along a time axis, which are one-dimensional time sequences at each spatial point in the spatial-temporal response signal matrix, and obtaining the event signal dataset containing various event signal training sets and test sets.

3. The 1D-CNN-based distributed optical fiber sensing signal feature learning and classification method, as recited in claim 2 wherein in the step (21), the constructed 1D-CNN includes ten layers, namely an input layer, a first convolution layer C1, a first pooling layer P1, a second convolution layer C2, a second pooling layer P2, a third convolution layer C3, a third pooling layer P3, a first fully connected layer FC1, a second fully connected layer FC2 and a softmax layer.

4. The 1D-CNN-based distributed optical fiber sensing signal feature learning and classification method, as recited in claim 2, wherein the step (23) comprises specific steps of:
   (231), calculating a cross entropy loss function C according to the classified output of the fully connected network, and estimating a distance between a true sample value and a predicted sample value according to a following formula of:

$$C = -\frac{1}{n}[y \ln a + (1-y)\ln(1-a)]; \quad (6)$$

wherein y, n and a respectively represent the predicted sample value, a total number of samples and the true sample value;
   (232), after calculating an update gradient according to the cross entropy loss function C, updating a network weight, and optimizing through an Adam algorithm as follows:

$$g_t = \nabla_\theta C_t(\theta_{t-1}) \quad (7);$$

$$m_t = \mu * m_{t-1} + (1-\mu) * g_t \quad (8);$$

$$n_t = \nu * n_{t-1} * (1-\nu) * g_t^2 \quad (9);$$

wherein: in the formulas (7)-(9), $g_t$ represents a calculated target function gradient at a $t^{th}$ iteration, $m_t$ and $n_t$ respectively represent estimations of gradient first-order and second-order moments at the $t^{th}$ iteration, and μ and v ∈[0,1) respectively represent exponential decay rates of the gradient first-order and second-order moments; and the CNN network parameter is updated according to a formula of:

$$\theta_t = \theta_{t-1} - \alpha * \frac{\hat{m}_t}{\sqrt{\hat{n}_t} + \varepsilon}; \quad (10)$$

wherein $$\hat{m}_t = \frac{m_t}{1-u^t} \text{ and } \hat{n}_t = \frac{n_t}{1-v^t}$$

are assumed at the $t^{th}$ iteration; a represents a learning rate, and ε is a number; and
(233), updating the 1D-CNN with the network parameter θ, and testing with signal samples in test sets; if the trained 1D-CNN is obtained after iteration is finished, executing the step (24); otherwise, retraining the adjusted and optimized 1D-CNN, and then executing the step (23) again.

5. The 1D-CNN-based distributed optical fiber sensing signal feature learning and classification method, as recited in claim 4, wherein the step (3) comprises specific steps of:
(31), respectively constructing four classifiers, namely a support vector machine (SVM) classifier, a decision tree (DT) classifier, a random forest (RF) classifier and an eXtreme gradient boosting (XGB) classifier; and
(32), classifying the event signal feature sets by each classifier, measuring a classification result of each classifier according to a confusion matrix, a classification precision, a recall ratio and an F-score indicator, and screening out the classifier.

6. The 1D-CNN-based distributed optical fiber sensing signal feature learning and classification method, as recited in claim 5, wherein the step (32) comprises specific steps of:
(321), classifying the event signal feature sets by each classifier to obtain classification results;
(322), evaluating and comparing the classification results of the different classifiers according to the confusion matrix of the classification results;
(323), calculating the classification precision, the recall ratio and the F-score indicator according to the classification results, so as to measure performances of the different classifiers; wherein specific formulas are as follows:

$$\text{Precision} = \frac{TP}{TP + FP}; \quad (11)$$

$$\text{Recall} = \frac{TP}{TP + FN}; \quad (12)$$

$$F-\text{score} = \frac{2*TP}{2*TP + FP + FN}; \quad (13)$$

wherein Precision represents the precision ratio, Recall represents the recall ratio, F-score is a comprehensive indicator of the precision ratio and the recall ratio, TP, FP, FN and TN respectively represent a correctly judged amount of a certain event type, an amount of A wrongly judged as other event types, an amount of other event types judged as A and an amount of other event types judged as other than A; and
(324), comprehensively evaluating and comparing the classification results of the different classifiers based on the classification result and the performance of each classifier, and screening out the classifier.

7. The 1D-CNN-based distributed optical fiber sensing signal feature learning and classification method, as recited in claim 6, wherein the step (4) comprises specific steps of:
(41), segmenting the time sequences acquired at all the spatial points according to a sample signal length prepared in a database;
(42), inputting the segmented time sequences into the trained one-dimensional convolution neural network, and taking 1D-CNN features automatically extracted in the first fully connected layer FC1 as the distinguishable event features; and
(43), inputting the distinguishable event features into the classifier to obtain the classification result.

8. The 1D-CNN-based distributed optical fiber sensing signal feature learning and classification method, as recited in claim 1, wherein in the step (21), the constructed 1D-CNN includes ten layers, namely an input layer, a first convolution layer C1, a first pooling layer P1, a second convolution layer C2, a second pooling layer P2, a third convolution layer C3, a third pooling layer P3, a first fully connected layer FC1, a second fully connected layer FC2 and a softmax layer.

9. The 1D-CNN-based distributed optical fiber sensing signal feature learning and classification method, as recited in claim 1, wherein the step (23) comprises specific steps of:
(231), calculating a cross entropy loss function C according to the classified output of the fully connected network, and estimating a distance between a true sample value and a predicted sample value according to a following formula of:

$$C = -\frac{1}{n}[y \ln a + (1-y)\ln(1-a)]; \quad (6)$$

wherein y, n and a respectively represent the predicted sample value, a total number of samples and the true sample value;
(232), after calculating an update gradient according to the cross entropy loss function C, updating a network weight, and optimizing through an Adam algorithm as follows:

$$g_t = \nabla_\theta C_t(\theta_{t-1}) \quad (7);$$

$$m_t = \mu * m_{t-1} + (1-\mu)*g_t \quad (8);$$

$$n_t = v * n_{t-1} * (1-v)*g_t^2 \quad (9);$$

wherein: in the formulas (7)-(9), $g_t$ represents a calculated target function gradient at a $t^{th}$ iteration, $m_t$ and $n_t$ respectively represent estimations of gradient first-order and second-order moments at the $t^{th}$ iteration, and μ and v ∈[0,1) respectively represent exponential decay rates of the gradient first-order and second-order moments; and the CNN network parameter is updated according to a formula of:

$$\theta_t = \theta_{t-1} - \alpha * \frac{\hat{m}_t}{\sqrt{\hat{n}_t} + \varepsilon}; \quad (10)$$

wherein $$\hat{m}_t = \frac{m_t}{1 - u^t} \text{ and } \hat{n}_t = \frac{n_t}{1 - v^t} \qquad (5)$$

are assumed at the $t^{th}$ iteration; α represents a learning rate, and ε is a number; and (233), updating the 1D-CNN with the network parameter θ, and testing with signal samples in test sets; if the trained 1D-CNN is obtained after iteration is finished, executing the step (24); otherwise, retraining the adjusted and optimized 1D-CNN, and then executing the step (23) again.

10. The 1D-CNN-based distributed optical fiber sensing signal feature learning and classification method, as recited in claim 9, wherein the step (3) comprises specific steps of:
(31), respectively constructing four classifiers, namely a support vector machine (SVM) classifier, a decision tree (DT) classifier, a random forest (RF) classifier and an eXtreme gradient boosting (XGB) classifier; and
(32), classifying the event signal feature sets by each classifier, measuring a classification result of each classifier according to a confusion matrix, a classification precision, a recall ratio and an F-score indicator, and screening out the classifier.

11. The 1D-CNN-based distributed optical fiber sensing signal feature learning and classification method, as recited in claim 10, wherein the step (32) comprises specific steps of:
(321), classifying the event signal feature sets by each classifier to obtain classification results;
(322), evaluating and comparing the classification results of the different classifiers according to the confusion matrix of the classification results;
(323), calculating the classification precision, the recall ratio and the F-score indicator according to the classification results, so as to measure performances of the different classifiers; wherein specific formulas are as follows:

$$\text{Precision} = \frac{TP}{TP + FP}; \qquad (11)$$

$$\text{Recall} = \frac{TP}{TP + FN}; \qquad (12)$$

$$F - \text{score} = \frac{2 * TP}{2 * TP + FP + FN}; \qquad (13)$$

wherein Precision represents the precision ratio, Recall represents the recall ratio, F-score is a comprehensive indicator of the precision ratio and the recall ratio, TP, FP, FN and TN respectively represent a correctly judged amount of a certain event type, an amount of A wrongly judged as other event types, an amount of other event types judged as A and an amount of other event types judged as other than A; and
(324), comprehensively evaluating and comparing the classification results of the different classifiers based on the classification result and the performance of each classifier, and screening out the classifier.

12. The 1D-CNN-based distributed optical fiber sensing signal feature learning and classification method, as recited in claim 11, wherein the step (4) comprises specific steps of:
(41), segmenting the time sequences acquired at all the spatial points according to a sample signal length prepared in a database;
(42), inputting the segmented time sequences into the trained one-dimensional convolution neural network, and taking 1D-CNN features automatically extracted in the first fully connected layer FC1 as the distinguishable event features; and
(43), inputting the distinguishable event features into the classifier to obtain the classification result.

* * * * *